United States Patent
Kunz

(10) Patent No.: US 6,691,024 B2
(45) Date of Patent: Feb. 10, 2004

(54) CONTROL OF INTERNAL COMBUSTION ENGINE BASED ON PHASE POSITION OF CAMSHAFT RELATIVE TO CRANKSHAFT

(75) Inventor: Franz Kunz, Altmannstein (DE)

(73) Assignee: Siemens Aktiengesellschaft, Munich (DE)

(*) Notice: Subject to any disclaimer, the term of this patent is extended or adjusted under 35 U.S.C. 154(b) by 123 days.

(21) Appl. No.: 10/078,270

(22) Filed: Feb. 20, 2002

(65) Prior Publication Data

US 2002/0112683 A1 Aug. 22, 2002

(30) Foreign Application Priority Data

Feb. 20, 2001 (DE) .......................... 101 08 055

(51) Int. Cl.[7] .............................. F01L 1/34; F02D 41/04; G06F 19/00
(52) U.S. Cl. ..................... 701/114; 701/115; 123/90.15; 123/90.17
(58) Field of Search ................. 701/101, 102, 701/103, 114, 115; 123/90.11, 90.12, 90.14, 90.15, 90.16, 90.17, 90.27, 90.31, 347, 348

(56) References Cited

U.S. PATENT DOCUMENTS 5,056,477 A * 10/1991 Linder et al. ............ 123/90.17
5,450,825 A * 9/1995 Geyer et al. ............. 123/90.17
6,505,113 B2 * 1/2003 Eichenseher et al. ....... 701/114
6,567,740 B2 * 5/2003 Eichenseher et al. ....... 701/114
2002/0007244 A1 * 1/2002 Shimizu ..................... 701/114

FOREIGN PATENT DOCUMENTS

| DE | 40 28 442 | 3/1992 |
| DE | 43 17 527 | 12/1993 |
| DE | 199 58 174 | 10/2000 |
| WO | 99/43930 | 9/1999 |

OTHER PUBLICATIONS

Patent Abstract of Japan, 07083080, Mar. 28, 1995.

* cited by examiner

Primary Examiner—Willis R. Wolfe
(74) Attorney, Agent, or Firm—Staas & Halsey LLP

(57) ABSTRACT

An internal combustion engine has a camshaft with an adjustable phase position relative to the crankshaft. Upon starting the internal combustion engine, the phase position is derived from a crankshaft angle detected by a crankshaft sensor and a camshaft angle detected by a camshaft sensor. If the phase position is within a predetermined threshold of a predetermined phase position, a correction value is calculated based on the deviation of the phase position, otherwise, the actual phase position is equated to the phase position derived from the crankshaft angle and the camshaft angle in an emergency running mode. During normal operation the actual phase position is calculated based on the phase position, derived from the crankshaft angle and the camshaft angle, and the correction value. In the emergency running mode, at least one control signal for an actuator is determined as a function of the actual phase position.

3 Claims, 3 Drawing Sheets

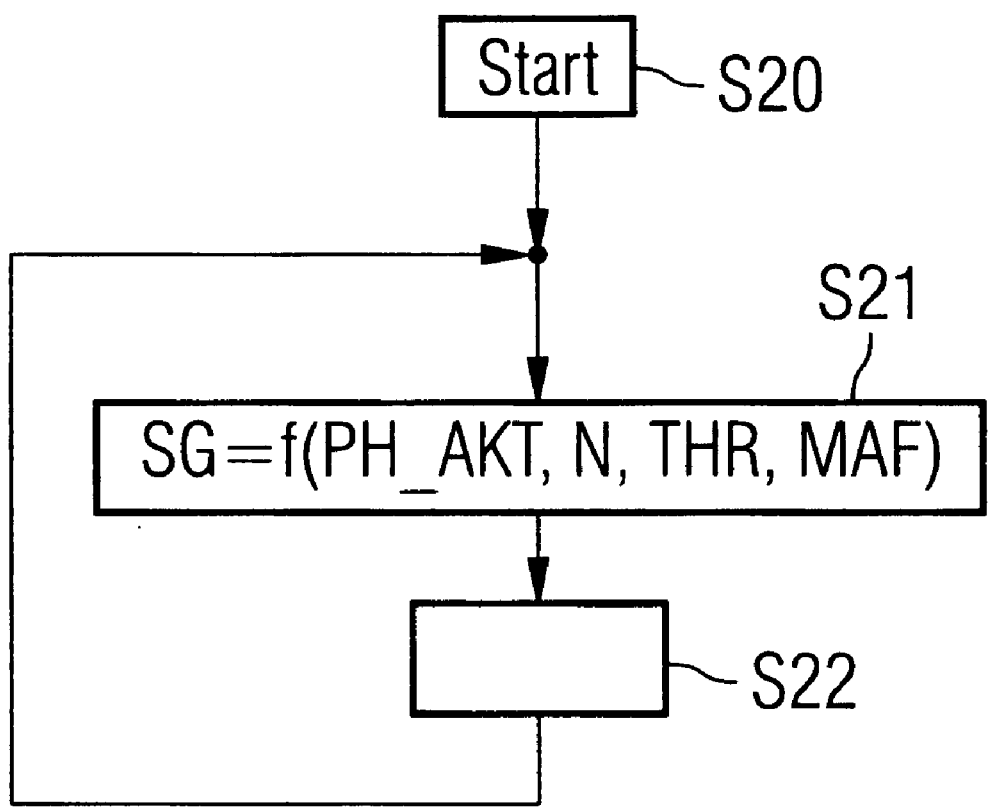

CONTROL OF INTERNAL COMBUSTION ENGINE BASED ON PHASE POSITION OF CAMSHAFT RELATIVE TO CRANKSHAFT

CROSS REFERENCE TO RELATED APPLICATIONS

This application is based on and hereby claims priority to German Application No. 10108055.7 filed on Feb. 20, 2001, the contents of which are hereby incorporated by reference.

BACKGROUND OF THE INVENTION

The invention relates to a method for controlling an internal combustion engine having a camshaft, the phase position of which is adjustable in relation to a crankshaft.

WO 99/43930 discloses a device for adjusting the sequence of movements of the inlet and exhaust valves of an internal combustion engine, in which the phase position of the camshaft can be adjusted in relation to a crankshaft. In this a mechanical adjusting part, which is controlled by way of a hydraulic system, is provided for adjustment of the phase position of the camshaft. The hydraulic system has a three-two-way valve, which is actuated by means of a control signal from a control device.

SUMMARY OF THE INVENTION

The object of the invention is to create a method for controlling an internal combustion engine having a camshaft, the phase position of which is adjustable in relation to a crankshaft, the method being on the one hand reliable and on the other permitting good operability in all operating conditions of the internal combustion engine.

The object is achieved by the features of the independent claim. Advantageous developments of the invention are identified in the subordinate claims.

BRIEF DESCRIPTION OF THE DRAWINGS

Exemplary embodiments of the invention are explained in more detail with reference to the diagrams, of which:

FIG. 3 is a flowchart of a program for determining a control signal.

DETAILED DESCRIPTION OF THE PREFERRED EMBODIMENT

Figure 1:
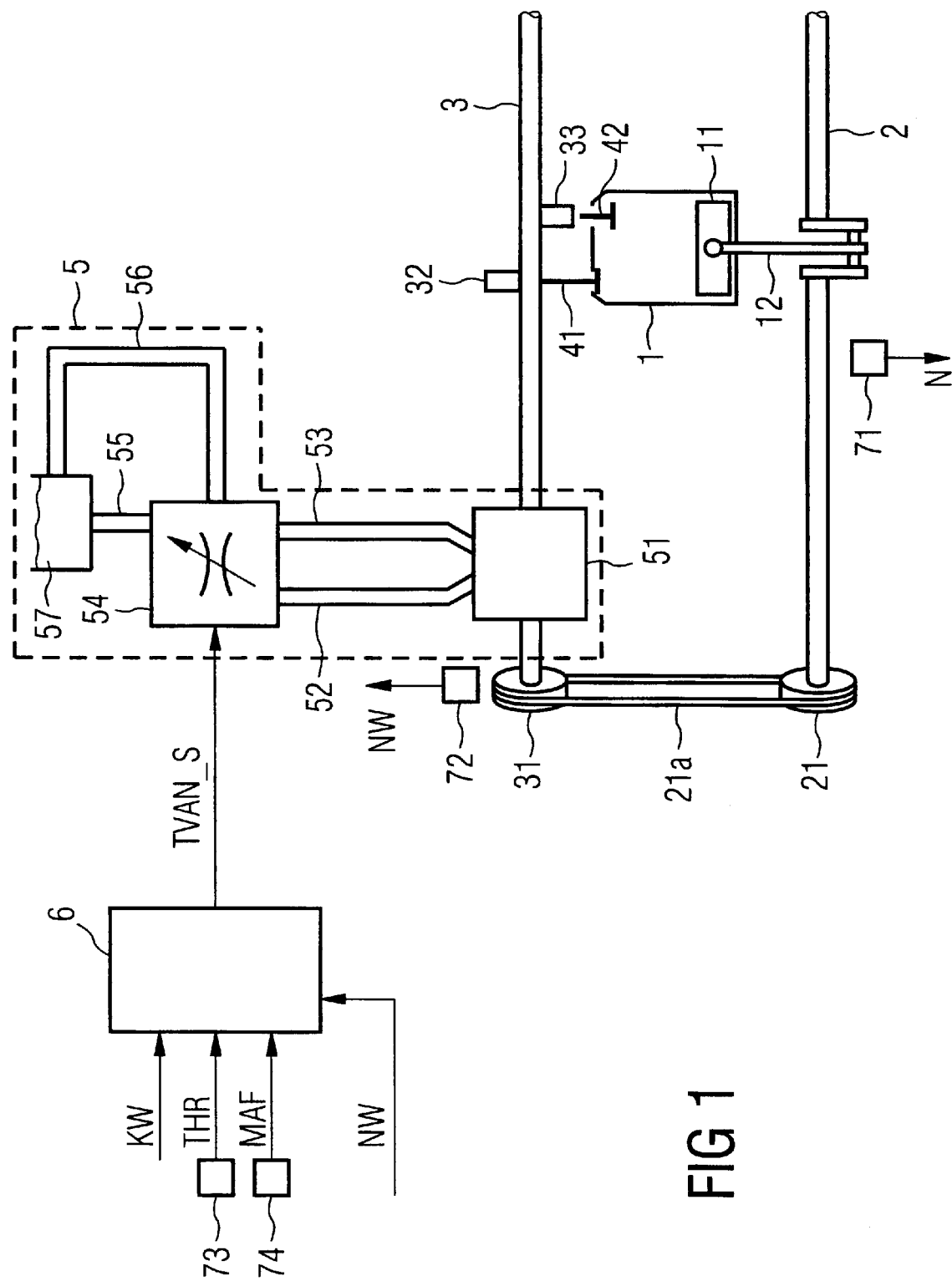
FIG. 1 is a block diagram of an internal combustion engine.
Figure 2:
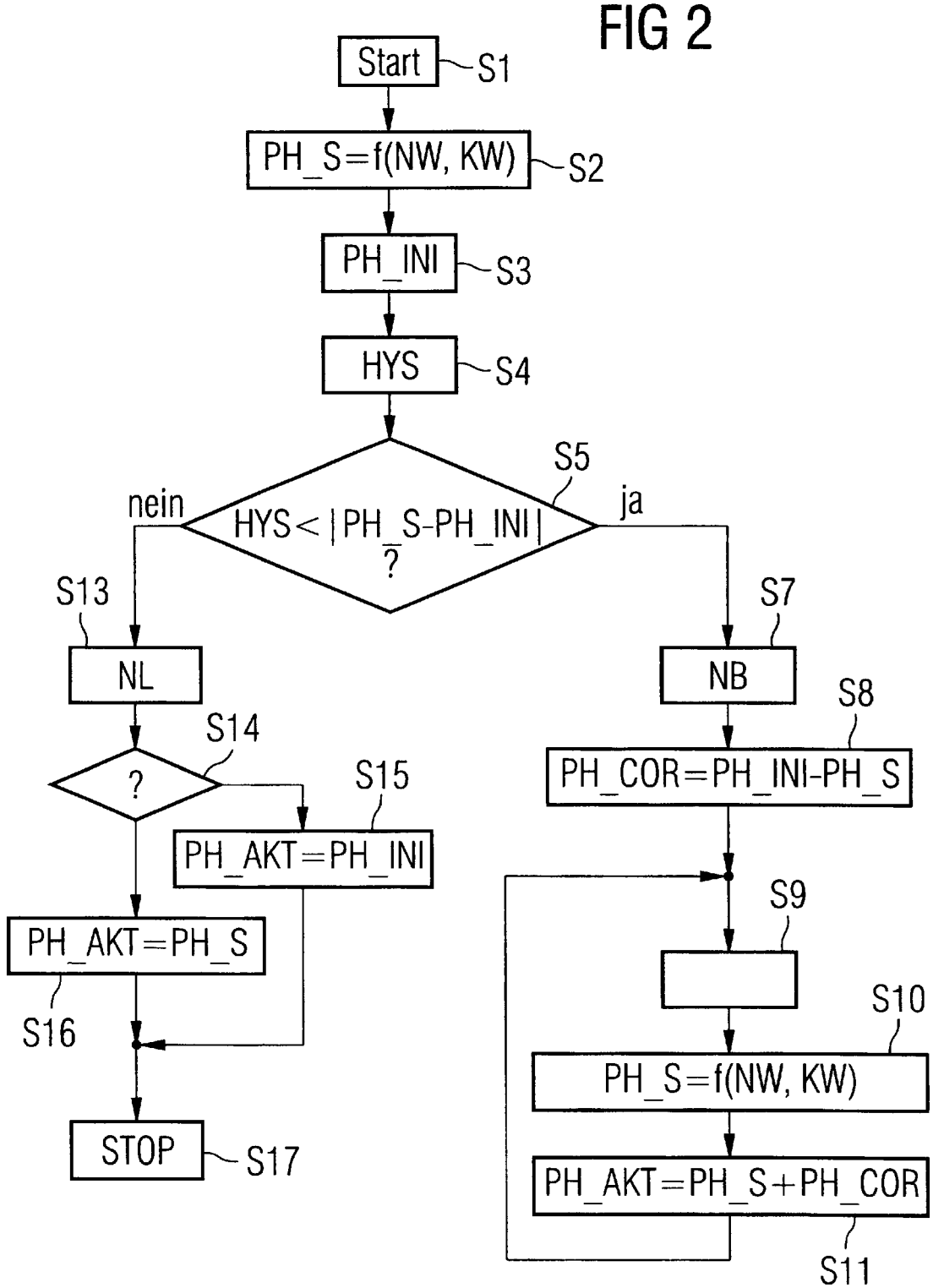
FIG. 2 is a flowchart of a program for determining an actual phase position.

Reference will now be made in detail to the preferred embodiments of the present invention, examples of which are illustrated in the accompanying drawings, wherein like reference numerals refer to like elements throughout.

Elements having the same design and function are consistently numbered with the same reference numbers in the different figures.

An internal combustion engine (FIG. 1) comprises a cylinder 1 with a piston 11 and a connecting rod 12. The connecting rod 12 is connected to the piston 11 and to a crankshaft 2. A first gear 21 is arranged on the crankshaft 2. The first gear 21 is mechanically coupled by way of a chain 21a to a second gear, which is arranged on a camshaft 3. The camshaft 3 has cams 32, 33, which act on inlet and exhaust valves 41, 42. The internal combustion engine is represented with one cylinder in FIG. 1. The internal combustion engine can obviously also have more than one cylinder.

An adjusting device 5 for adjusting the phase position of the camshaft 3 in relation to the crankshaft 2, and thereby adjusting the sequence of movements of the inlet and exhaust valves, is assigned to the internal combustion engine. The adjusting device 5 has a mechanical adjusting part, which is hydraulically adjustable and thus adjusts the phase position of the camshaft 3. The mechanical adjusting part 51 is connected by way of hydraulic lines 52, 53 to an actuator 54, which preferably takes the form of a hydraulic three-two-way valve. The actuator is connected to a high-pressure hydraulic line 55 and to a low-pressure hydraulic line 56 with an oil reservoir 57, to which an oil pump is assigned. During operation of the internal combustion engine the oil pump ensures a predetermined pressure in the oil reservoir and hence also in the high-pressure hydraulic line 55.

If the internal combustion engine is in an inoperative engine condition, that is to say no combustion is taking place in the cylinder 1 and the crankshaft is not rotating, the pressure in the oil reservoir gradually subsides as therefore does the pressure in the high-pressure hydraulic line. Furthermore, the pressure in the hydraulic lines 52 and 53 also falls, as a result of which the mechanical adjusting part 51 is shifted into a limit position.

A control device 6 is provided, to which sensors are assigned, which register various measured variables and determine the measured value of the measured variables at any one time. As a function of the measured variables the control device 6 also determines a control signal TVAN_S not only for the actuator 54 but also for other actuators, such as a spark plug (not shown), an injection valve or a throttle valve.

The sensors take the form of a crankshaft sensor 71, which registers a crankshaft angle KW of the crankshaft 2 or from the variation in the latter over time derives a rotational speed N, an air-mass flow sensor 74, which registers the air-mass flow MAF, and a throttle valve sensor 73, which registers a degree of opening THR of the throttle valve. Any lesser number of the sensors or also additional sensors may be provided, depending on the embodiment of the invention.

FIG. 1 shows a flowchart of a program, which is executed when starting the internal combustion engine and also in part, as necessary, at cyclical intervals during further operation. The program is started in a stage S1. This follows very soon after starting of the internal combustion engine, that is to say during the initial revolutions of the crankshaft.

In a stage S2, a sensor value PH_S for the phase position of the camshaft 3 in comparison to the crankshaft 2 is determined as a function of the registered camshaft angle NW and the crankshaft angle KW. Where necessary, this can also be done by suitable averaging or in some other way with multiple successive measured values of the crankshaft angle KW and the camshaft angle NW.

A predetermined phase position PH_INI from a memory is inputted in a stage S3. The predetermined phase position PH_INI is the phase position assumed by the camshaft 3 in relation to the crankshaft 2 when the adjusting device 51 is in its limit position, that is to say in the unadjusted position, assuming that all mechanical parts are coordinated with one another in the manner specified. On starting of the internal combustion engine, the adjusting device 51 should be in the limit position, since the hydraulic pressure will have fallen while the internal combustion engine is at a standstill.

In a stage S4, a hysteresis value is inputted, which takes account of the mechanical tolerances and fitting tolerances of the mechanical parts and also the tolerances of the crankshaft sensor 71 and of the camshaft sensor 72. The tolerances of the crankshaft sensor 71 and of the camshaft sensor 72 typically have a determining influence on the hysteresis value HYS, while the tolerances of the other mechanical parts and the further fitting tolerances of the mechanical parts play a subordinate role here.

In a stage S5, it is analyzed whether the difference between the sensor value PH_S for the phase position and the predetermined phase position PH_INI is smaller than the hysteresis value HYS. If this is the case, the operating condition of the internal combustion engine is set to normal operation NB in a stage S7.

In a stage S8, a correction value PH_COR is determined as a function of the difference between the predetermined phase position PH_INI and the sensor value PH_S for the phase position. Here, this difference may be assigned directly to the correction value PH_COR, or the difference may be weighted with an evaluation factor, or averaging may be performed over successively registered values for the difference.

Stage S9 is assumed for a predetermined waiting time, during which the program is preferably interrupted and other programs are run in the control device 6.

In a stage S10, the sensor value PH_S for the phase position is determined as a function of the camshaft angle NW and the crankshaft angle KW.

In a stage S11 an actual phase position PH_AKT is then calculated from the sum of the sensor value PH_S for the phase position and the correction value PH_COR. In normal operation NB the actual phase position PH_AKT is thus registered extremely precisely, assuming that errors are essentially attributable to the tolerances of the crankshaft sensor 71 and the camshaft sensor 72.

Processing is then resumed at stage S9. Stages S9 to S11 are each run through cyclically in turn preferably throughout the operation of the internal combustion engine.

If the condition in stage S5 is not fulfilled, that is to say the difference between the sensor value PH_S for the phase position and the predetermined phase position PH_INI is greater than the hysteresis value HYS, the processing is continued in a stage S13.

In stage S13, the operating condition of the internal combustion engine is set to emergency running NL. In the emergency running NL operating condition, only limited operation of the internal combustion engine is possible, with the aim of getting a vehicle provided with the internal combustion engine safely to a service workshop. In the emergency running NL operating condition there is preferably no further adjustment of the phase position of the camshaft 3 in relation to the crankshaft 2, and the rotational speed N of the crankshaft or the driving speed of the vehicle is limited to a predetermined value.

In a stage S14, it is analyzed whether the crankshaft sensor 71 and the camshaft sensor 72 are functioning correctly. If this is not the case, the predetermined phase position PH_INI is assigned to the actual phase position PH_AKT in a stage S15.

If the condition in stage S14 is fulfilled, however, the sensor value PH$_{13}$ S for the phase position is assigned to the actual phase position PH_AKT in a stage S16. The assignment in stage S16 proceeds from the finding that in the event of this emergency running mode there is a defect present in the mechanical components determining the phase position of the camshaft 3 in relation to the crankshaft 2. This may be a so-called chain shedding, for example, or if a belt is provided instead of the chain 21a a belt shedding, or an incorrectly tensioned chain or an incorrectly tensioned belt. These faults may result in variation of the phase position of up to 30 degrees or even more.

In a stage S17, the program is then stopped. Alternatively, in emergency running mode NB, the sensor value PH_S for the phase position can also be cyclically re-determined each time and stage S16 then performed.

FIG. 3 shows a further program, which is performed cyclically during the operation of the internal combustion engine. The program is started in a stage S20. In a stage S21 a control signal SG for an actuator of the internal combustion engine, preferably the throttle valve or the injection valve, is determined as a function of the actual phase position PH_AKT, the rotational speed N, the degree of opening THR of the throttle valve and the air-mass flow MAF. This is preferably done by means of a dynamic model of the inlet manifold of the internal combustion engine. The actual phase position PH_AKT has a determining influence on the proportion of residual gases present in the cylinder 1 prior to combustion and also on the charge itself. The fact that a precise value for the actual phase position PH_AKT is available, even in emergency running NL of the internal combustion engine, ensures good operability of the internal combustion engine in a vehicle and at the same time ensures that the emissions are low, since the air ratio in the cylinder can be precisely adjusted. In this way, good driveability as far as the nearest service workshop can still be ensured even in the case of an internal combustion engine that cannot run on particularly lean mixtures.

The invention has been described in detail with particular reference to preferred embodiments thereof and examples, but it will be understood that variations and modifications can be effected within the spirit and scope of the invention.

What is claimed is:

1. A method for controlling an internal combustion engine having a camshaft, a crankshaft, a camshaft sensor and a crankshaft sensor, the phase position of the camshaft being adjustable in relation to the crankshaft, the crankshaft sensor registering the crankshaft angle, and the camshaft sensor registering the camshaft angle, said method comprising:

deriving a phase position from registered crankshaft and camshaft angles upon starting the internal combustion engine;

determining deviation of the phase position from a predetermined phase position;

if the deviation is less than a predetermined threshold, operating the internal combustion engine in a normal operation mode by calculating a correction value as a function of the deviation of the phase position from the predetermined phase position, and calculating an actual phase position as a function of the phase position, derived from the registered crankshaft and camshaft angles, and the correction value; and if the deviation is not less than the predetermined threshold, operating the internal combustion engine in an emergency running mode by equating the actual phase position to a derived phase position based on the registered crankshaft and camshaft angles; and determining at least one control signal for an actuator of the internal combustion engine as a function of the actual phase position during operation of the internal combustion engine.

2. A computer readable medium storing at least one program for controlling a processor to perform a method for controlling an internal combustion engine having a camshaft, a crankshaft, a camshaft sensor and a crankshaft sensor, the phase position of the camshaft being adjustable in relation to the crankshaft, the crankshaft sensor registering the crankshaft angle, and the camshaft sensor registering the camshaft angle, said method comprising:

deriving a phase position from registered crankshaft and camshaft angles upon starting the internal combustion engine;

determining deviation of the phase position from a predetermined phase position;

if the deviation is less than a predetermined threshold, operating the internal combustion engine in a normal operation mode by calculating a correction value as a function of the deviation of the phase position from the predetermined phase position, and calculating an actual phase position as a function of the phase position, derived from the registered crankshaft and camshaft angles, and the correction value; and if the deviation is not less than the predetermined threshold, operating the internal combustion engine in an emergency running mode by equating the actual phase position to a derived phase position based on the registered crankshaft and camshaft angles; and determining at least one control signal for an actuator of the internal combustion engine as a function of the actual phase position during operation of the internal combustion engine.

3. A system for controlling an internal combustion engine having a camshaft, a crankshaft, a camshaft sensor and a crankshaft sensor, the phase position of the camshaft being adjustable in relation to the crankshaft, the crankshaft sensor registering the crankshaft angle, and the camshaft sensor registering the camshaft angle, said system comprising:

a processor to determine deviation of the phase position from a predetermined phase position, the phase position derived from registered crankshaft and camshaft angles upon starting the internal combustion engine, and if the deviation is less than a predetermined threshold, operating the internal combustion engine in a normal operation mode by calculating a correction value as a function of the deviation of the phase position from the predetermined phase position and calculating an actual phase position as a function of the phase position, derived from the registered crankshaft and camshaft angles, and the correction value, while if the deviation is not less than the predetermined threshold, operating the internal combustion engine in an emergency running mode by equating the actual phase position to a derived phase position based on the registered crankshaft and camshaft angles, and determining at least one control signal for an actuator of the internal combustion engine as a function of the actual phase position during operation of the internal combustion engine.

* * * * *